United States Patent [19]

Ishikawa

[11] Patent Number: 5,523,541
[45] Date of Patent: Jun. 4, 1996

[54] METHOD AND APPARATUS FOR CONTROLLING CONSTANT CURRENT FOR RESISTANCE WELDING

[75] Inventor: Sakae Ishikawa, Chiba-ken, Japan

[73] Assignee: Miyachi Technos Corporation, Chiba-ken, Japan

[21] Appl. No.: 321,767

[22] Filed: Oct. 12, 1994

[30] Foreign Application Priority Data

Oct. 14, 1993 [JP] Japan .................. 5-280517

[51] Int. Cl.⁶ .............................................. B23K 11/24
[52] U.S. Cl. .............................................. 219/110
[58] Field of Search ................................ 219/108, 109, 219/110

[56] References Cited

U.S. PATENT DOCUMENTS

| | | | |
|---|---|---|---|
| 4,289,948 | 9/1981 | Jurek et al. | 219/110 |
| 4,399,511 | 8/1983 | Jurek | 219/110 |
| 4,465,918 | 8/1984 | Kiriyama et al. | 219/110 |
| 4,493,040 | 1/1985 | Vanderhelst | 219/110 |
| 4,634,830 | 1/1987 | Furudate | 219/110 |
| 4,885,451 | 12/1989 | Farrow et al. | 219/110 |
| 5,124,521 | 6/1992 | Boyer et al. | 219/110 |

*Primary Examiner*—Clifford C. Shaw
*Attorney, Agent, or Firm*—Wenderoth, Lind & Ponack

[57] ABSTRACT

A control apparatus controls a welding current of a resistance welding machine by controlling a thyristor firing angle. A memory stores data of a predetermined relationship between thyristor firing angle and welding current for a parameter of power factor. A microprocessor reads the measurements of a welding current and power factor angle of a previous welding operation having a welding condition similar to that of a present welding operation. The microprocessor determines the initial thyristor firing angle from the measurements of the previous welding operation and a set welding current of a present welding operation. The initial thyristor firing angle is used to control a welding current of a first cycle of the present welding operation. The arrangement provides an ideal constant-current control, yielding a satisfactory weldment.

11 Claims, 7 Drawing Sheets

METHOD AND APPARATUS FOR CONTROLLING CONSTANT CURRENT FOR RESISTANCE WELDING

BACKGROUND OF THE INVENTION

1. Field

The present invention relates to a method and apparatus for controlling a constant welding current for resistance welding.

2. Prior Art

A conventional alternating current resistance welding machine employs a pair of thyristors as contactors. The thyristors are connected to a primary coil of a welding transformer. A welding current from a secondary coil of the welding transformer flows through two overlapping workpieces, thus heating and melting them by Joule's heat into a metallurgically joined weldment.

Figure 9:
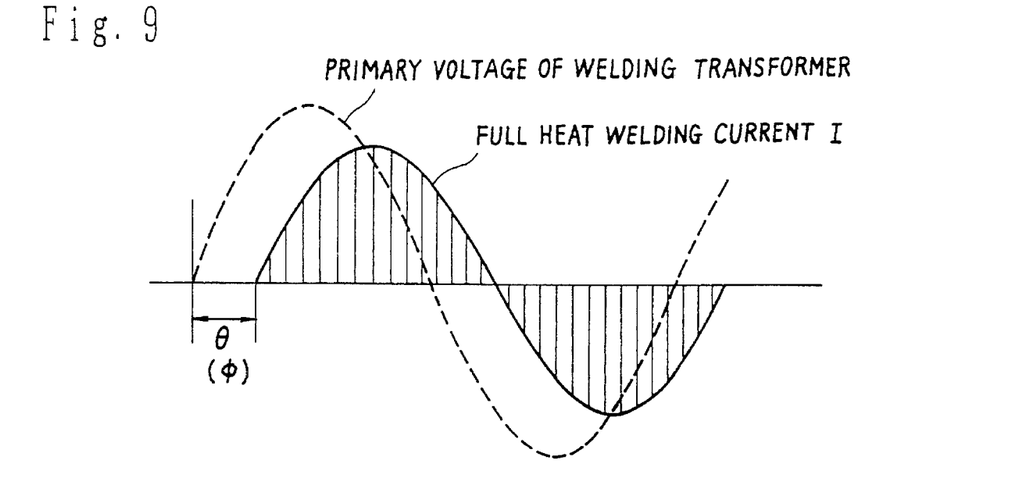
FIG. 9 is a graph showing a welding current waveform obtained with a thyristor firing angle chosen equal to a power factor angle.
Figure 10:
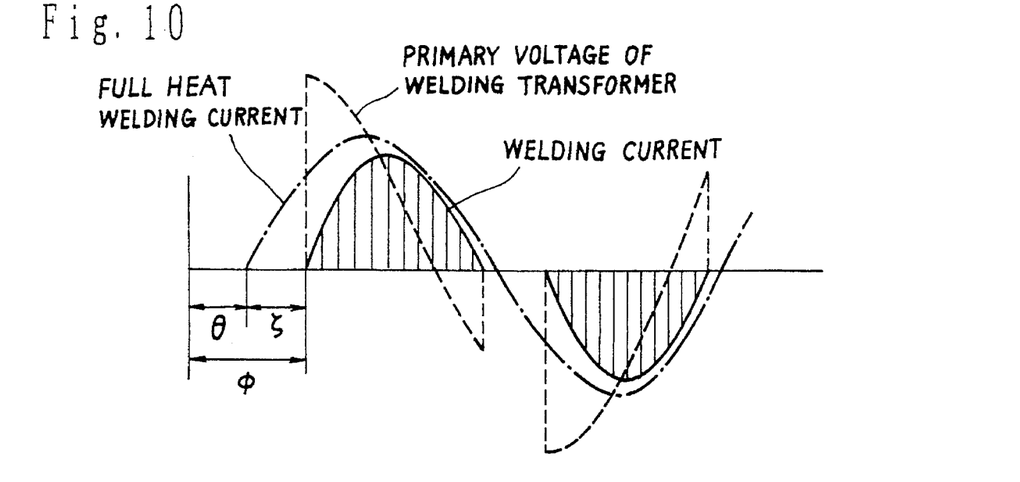
FIG. 10 is a graph showing a welding current waveform obtained with a thyristor firing angle chosen different from a power factor angle.

Welding current control is achieved by controlling a thyristor firing angle. The principle is shown in FIGS. 9 and 10. In FIG. 9, the thyristor firing angle $\phi$ is set equal to a power factor angle $\theta$. This results in an essentially continuous sinusoidal or "full heat" welding current I. In FIG. 10, the thyristor firing angle $\phi$ is greater than or lags the power factor angle $\theta$ by a delay time $\zeta$. This causes discontinuity in the primary voltage of the welding transformer, resulting in a reduced and discontinuous welding current, a so-called "heat control" current. The greater the firing angle $\phi$, the longer the voltage rest interval and the smaller the welding current. In this manner, the firing angle control achieves control of the welding current magnitude. Thus, the constant-current control of the welding current may be achieved by controlling the thyristor firing angle $\phi$ such that the welding current I of each cycle matches the set welding current $I_0$.

The prior art constant-current control system employs a current detector which is connected in a primary or secondary circuit of the welding transformer to measure a welding current. A feed-back control computes the error between the welding current measured in a previous cycle with the set welding current and determines the thyristor firing angle from the error such that the actual welding current will match the set welding current. However, for the first cycle of a welding operation, the prior-art constant-current control system turns on the thyristor at a predetermined firing angle since the feed-back control does not operate for the first cycle.

Figure 11:
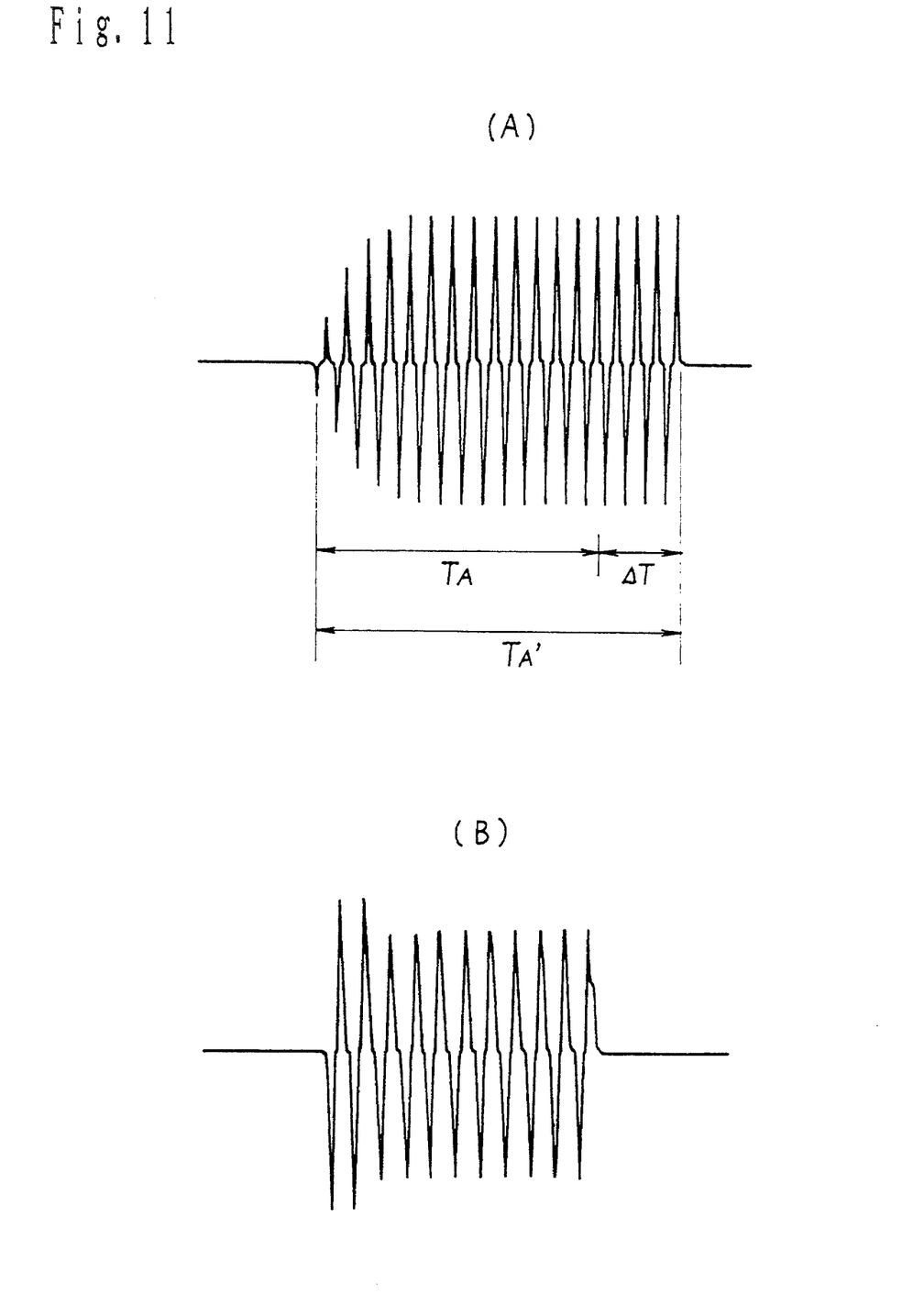
FIG. 11 is a graph showing a welding current waveform obtained with the prior art constant-current control.

As mentioned, the prior art constant-current control system lacks a technique for correctly determining the thyristor firing angle at the beginning of a welding operation. Typically, it choses an initial thyristor firing angle which causes a reduced welding current to flow at the beginning cycles of the welding operation, as shown in FIG. 11(A). This method requires a welding time $T_A$, which is longer than the desired time $T_A$ by $\Delta T$ because of a delay in the heating of the workpieces. Such a delay slows the melting of the welding zone, and fatally damages the weld quality in the application of the projection welding. A contrary method is to choose an initial thyristor firing angle such that a welding current I exceeding the desired current $I_0$ flows at the beginning cycles of the welding, as shown in FIG. 11(B). This, however, tends to generate a splash, yielding an unsatisfactory weldment.

SUMMARY OF THE INVENTION

It is, therefore, an object of the invention to provide a method and apparatus for controlling a welding current of a resistance welding machine, having an improved constant-current control feature capable of starting a welding operation with a desired welding current, assuring a satisfactory weldment.

The object is essentially achieved by a method for controlling an alternating current resistance welding machine having a predetermined relationship between a thyristor firing angle and a welding current for a power factor angle parameter by controlling the thyristor firing angle on a cycle-by-cycle basis such that the resultant welding current will be essentially equal to a desired welding current setting, comprising the steps of determining the thyristor firing angle from a welding current and power factor angle measured in a previous welding and from the set welding current of a present welding in accordance with the predetermined relationship; and controlling a welding current of a first cycle of the present welding with the determined thyristor firing angle, and controlling a welding current of a subsequent cycle of the present welding with the thyristor firing angle that reduces an error between a measured welding current of a previous cycle and the set welding current of the present welding.

An aspect of the invention provides an apparatus for controlling an alternating current resistance welding machine having a predetermined relationship between a thyristor firing angle and a welding current for a power factor angle parameter, comprising: table storage means for storing data of the predetermined relationship; a first determining means for determining the thyristor firing angle from a welding current and power factor angle measured in a previous welding and from a set welding current of a present welding in accordance with the stored data of the predetermined relationship; a second determining means for determining the thyristor firing angle from an error between a measured welding current and the set welding current; a current control means for controlling a welding current of a first cycle of the present welding with the determined thyristor firing angle by the first determining means, and for controlling a welding current of a subsequent cycle of the present welding with the determined thyristor firing angle by the second determining means.

The present apparatus operates as follows. When a welding operation is desired, it reads from the storing means a welding current and power factor angle measured in a previous welding operation having the same or similar welding condition to that of the present welding operation. The apparatus determines the thyristor firing angle from these measured values and from a set welding current of the present welding operation in accordance with the predetermined relationship between thyristor firing angle and welding current stored in the table storage means. The thyristor firing angle thus determined is used to control a welding current of a first cycle of the present welding operation. The apparatus controls a welding current of a subsequent cycle with the thyristor firing angle determined from the error of a measured welding current from the set welding current. While controlling the thyristor firing angle, the apparatus measures a power factor angle and welding current of the present welding operation and stores the measurements for a subsequent welding operation.

BRIEF DESCRIPTION OF THE DRAWINGS

The invention will be better understood from the following description taken in conjunction with the drawings in which.

DETAILED DESCRIPTION OF PREFERRED EMBODIMENT

The invention will now be described in detail with respect to a preferred embodiment in connection with FIGS. 1–8.

Figure 1:
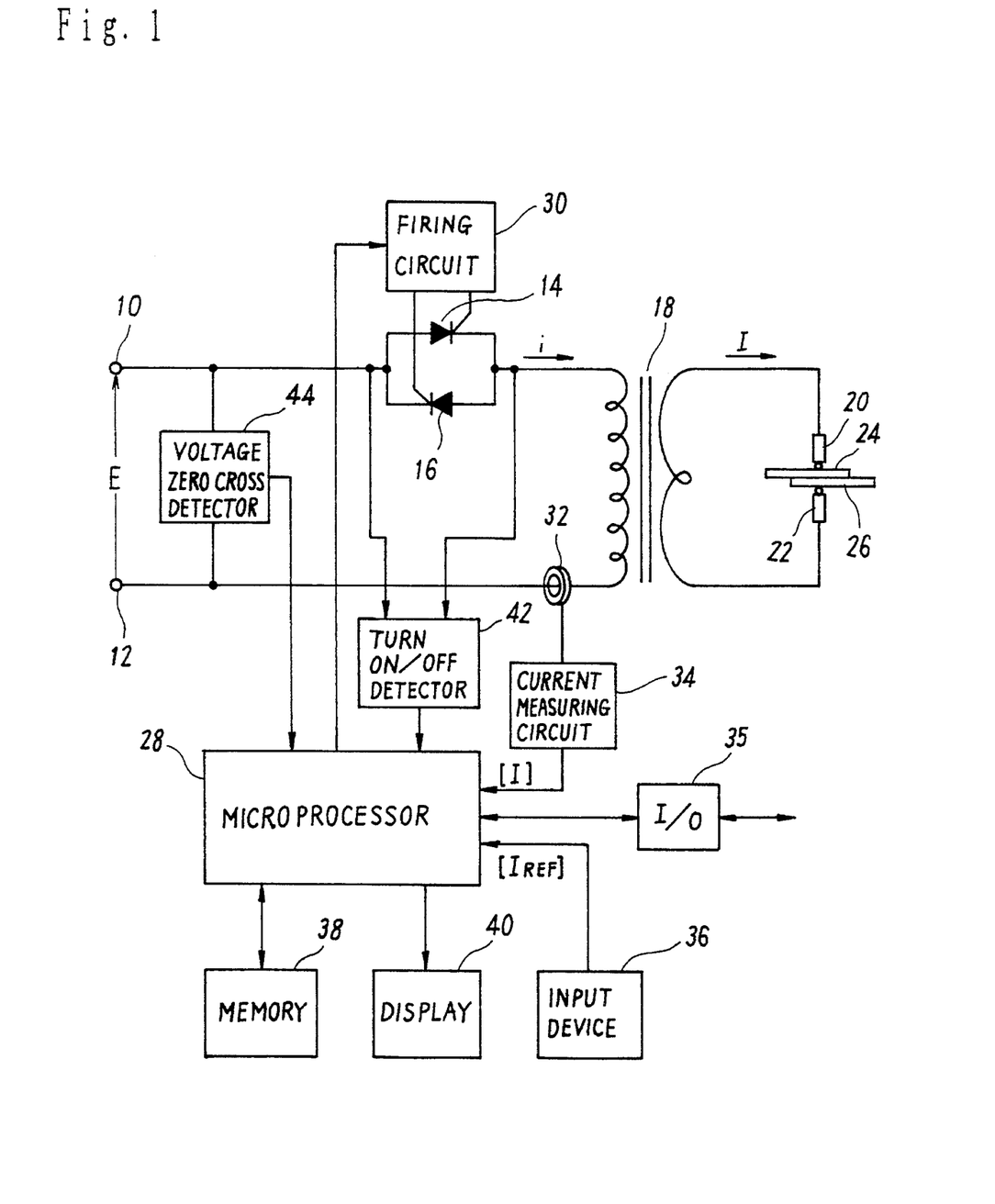
FIG. 1 is a circuit diagram of an alternating current resistance welding machine incorporating a constant-current control apparatus in accordance with an embodiment of the invention.

FIG. 1 shows a circuit of an alternating current resistance welding machine to which a control apparatus of the embodiment applies. A commercial AC voltage E is applied to input terminals 10 and 12 of the resistance welding machine. The voltage is supplied to a primary coil of a welding transformer 18 through a pair of thyristors 14 and 16 used as contactors. A secondary coil of the welding transformer 18 induces an electromotive force (secondary voltage). The secondary voltage is applied across a pair of workpieces 24 and 26 by a pair of electrode chips 20 and 22, causing a welding current I to flow through the workpiece pair.

The magnitude (effective value) of a welding current I can be controlled by the thyristor firing angle at which a thyristor is turned on. In the present control apparatus, a microprocessor 28 controls the firing angles or timings of thyristors 14 and 16 through a firing circuit 30 for controlling the magnitude of the welding current I.

A welding current $i_1$ in the primary circuit of the welding transformer 18 is proportional to and in phase with the welding current I in the secondary circuit of the welding transformer. For constant-current control, a current transformer (CT) 32 (current detector) is provided in the primary circuit. CT 32 outputs a voltage signal indicative of a derivative of the welding current. A current measuring circuit 34 receives the output signal from CT 32 to measure the welding current I. The measured welding current is designated by [I].

The measured welding current [I] is supplied to the microprocessor 28. The microprocessor 28 computes the error between the measured welding current [I] with a set welding current [IREF] on a cycle-by-cycle basis and determines a thyristor firing angle of the next cycle from the error. At the next cycle, the microprocessor 28 turns on or "fires" the thyristors 14 and 16 at the angle thus determined. For the first cycle, the microprocessor 28 uniquely determines the initial thyristor firing angle in a different manner in accordance with the invention. It determines the initial thyristor firing angle $\phi_0$ of a present welding operation from a maximum welding current and power factor angle measured in a previous welding operation and from the set welding current [IREF] of the present welding operation in accordance with the predetermined relationship between thyristor firing angle and relative welding current, as will be detailed. The microprocessor 28 receives the set welding current [IREF] from an input device 36 and writes it into a memory 38.

Figure 2:
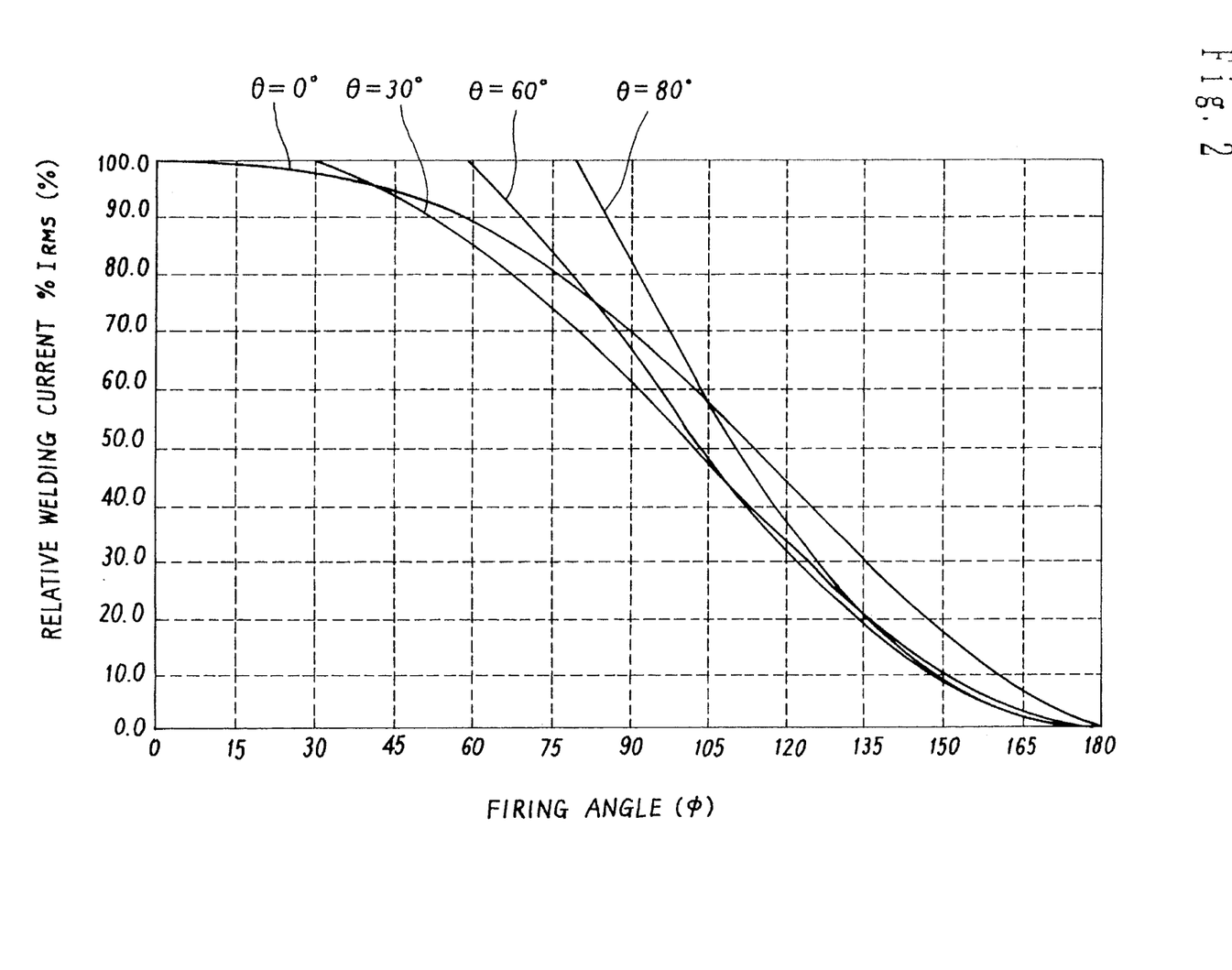
FIG. 2 is a graph showing the relationship between the thyristor firing angle and the relative welding current, of the resistance welding machine in FIG. 1.

The memory 38 stores data and programs for the operation of the microprocessor 28. In accordance with the embodiment, the memory 38 stores a table of the relationship between thyristor firing angle and relative welding current for a parameter of power factor angle shown in FIG. 2. For simplicity, FIG. 2 shows only four characteristic curves of the relationship for θ=0°, 30°, 60° and 80°. Actually, the stored table includes a large number of characteristic curves for discrete values of θ with a fine step of, say, 0.5 degree.

The relationship is theoretically determined from the combination of power factor angle θ, relative welding current %IRMS and thyristor firing angle. The changing, however, of the welding transformer, welding gun and or material of the workpiece changes the power factor angle θ and the maximum welding current IMAX of the resistance welding machine. This also changes the relative welding current %IRMS which is the ratio of the actual welding current I to the maximum welding current IMAX. Further, it changes the relation of [I] and [IREF] with the power factor angle θ and firing angle φ. In short, unless the maximum welding current IMAX or power factor angle θ is known, the initial thyristor firing angle cannot properly be determined from a set welding current [IREF].

The embodiment determines an appropriate initial thyristor firing angle as follows. For each welding operation, it measures the power factor ang angle θ and maximum or relative welding current IMAX or %IRMS and saves the results into the memory 38. When the condition of the resistance welding machine changes, e.g., when the welding gun has changed, the microprocessor 28 reads from the memory 38 data of power factor angle [θ] and maximum welding current [IMAX] measured in a previous welding operation involving the same welding Gun as the changed welding gun. Then, it determines the initial thytristor firing angle from the read data of [θ] and [IMAX] and from the set welding current [IREF] of the present welding operation.

The embodiment measures the power factor angle θ on a cycle-by-cycle basis. To this end, a turn-on/off detector 42 and voltage zero cross detector 44 are provided in the primary circuit. The turn-on/off detector 42 detects the start and end of the flow of the welding current $i_1$ for each half cycle by monitoring the voltage across the thyristors 14 and 16. When the thyristor 14 or 16 turns on (i.e., the welding current starts flowing), the voltage is stepped down whereas the voltage is stepped up when the thyristor 14 or 16 turns off (i.e., the welding current stops flowing). The turn-on/off detector 42 supplies the turn-on/off signal to the microprocessor 28 so that the microprocessor detects when the welding current starts or stops flowing. The voltage zero cross detector 44 detects zero crossings of the supplied voltage E for each half cycle and supplies the detected signal to the microprocessor 28. The microprocessor measures the power factor angle θ for each half cycle from the timings of the turn-on/off signal from the detector 42 and the voltage zero cross signal from the detector 44, using a formula or look-up table.

Measuring the power factor angle θ of the embodiment will now be described with reference to FIGS. 3–6.

Figure 3:
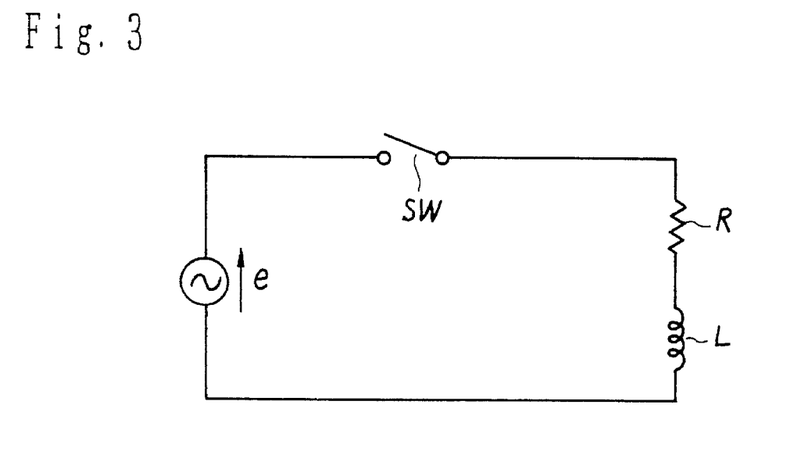
FIG. 3 is a circuit diagram showing an equivalent circuit of the resistance welding machine.

FIG. 3 shows an equivalent circuit to the circuit of the resistance welding machine in FIG. 1. In the equivalent circuit, the inductance L is primarily the leakage reactance of the welding transformer (18). The resistance R indicates the combined resistance including the resistance values of the primary and secondary conductors and the workpieces (24, 26), etc. The switch SW represents the thyristors (14, 16). The AC voltage e indicates the supplied voltage (E) in FIG. 1.

Figure 4:
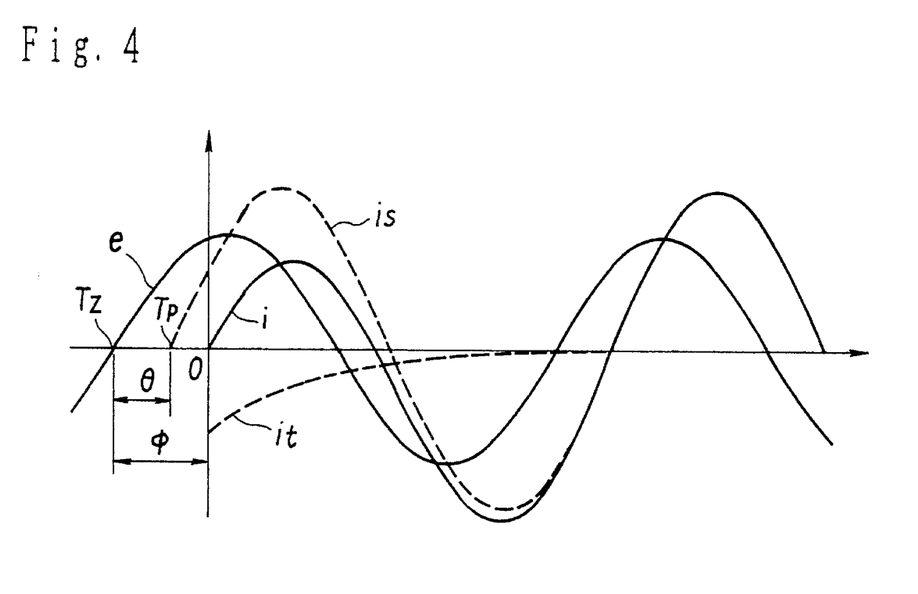
FIG. 4 is a graph showing voltage and current waveforms in the equivalent circuit of FIG. 3.

When the switch SW is closed at the time [0], the current i flows in the LR circuit, as shown in FIG. 4. In FIG. 4, $i_s$ indicates a stationary current component whereas $i_t$ indicates a transient current component. The actual current i results from combining the stationary and transient components. The thyristor firing angle φ is defined by the angle formed between a preceding voltage zero cross time $T_z$ and the firing time [0]. The power factor angle θ is defined by the angle formed between the voltage zero cross time $T_z$ and an imaginary zero cross time $T_p$ of the stationary current component $i_s$. The current i is expressed by $$i = i_s + i_t \quad (1)$$
$$= \sin(\omega t + \phi - \theta) - \sin(\phi - \theta) \cdot \exp(-R/L)t$$

in which
 ω=angular frequency,
 R=resistance,
 L=inductance,
 φ=thyristor firing angle
 θ=power factor angle, and
 t=time.

The power factor angle can be computed by solving the formula (1) with respect to θ, using the current zero cross time measured for each cycle or each half cycle.

Figure 5:
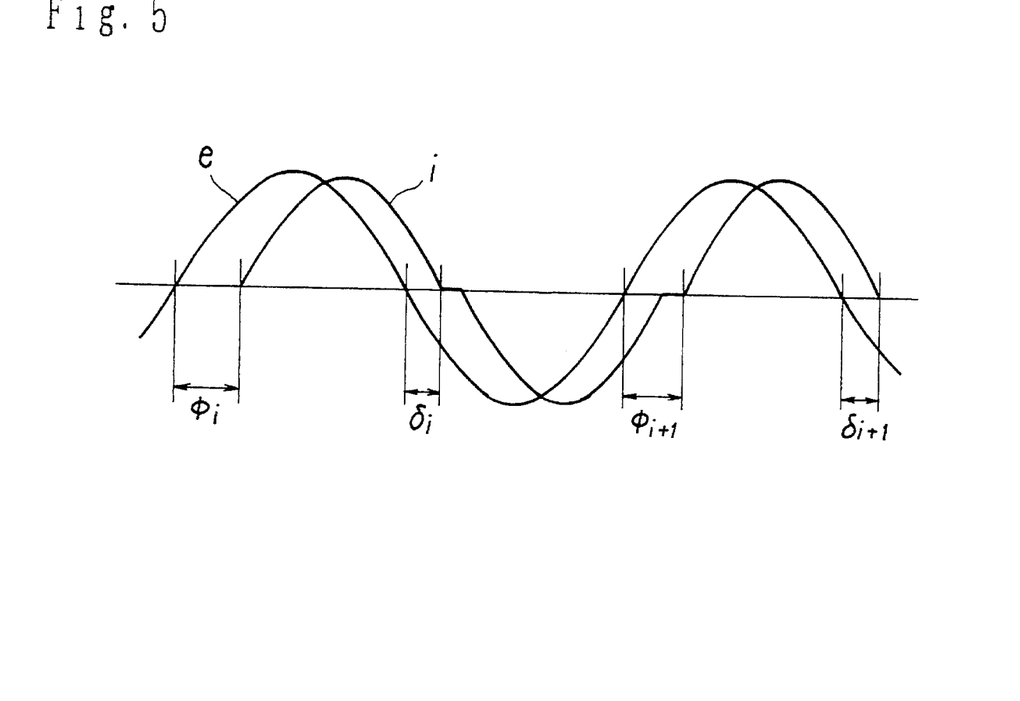
FIG. 5 is a graph of voltage and current waveforms, showing how to measure the power factor angle in accordance with the embodiment.
Figure 6:
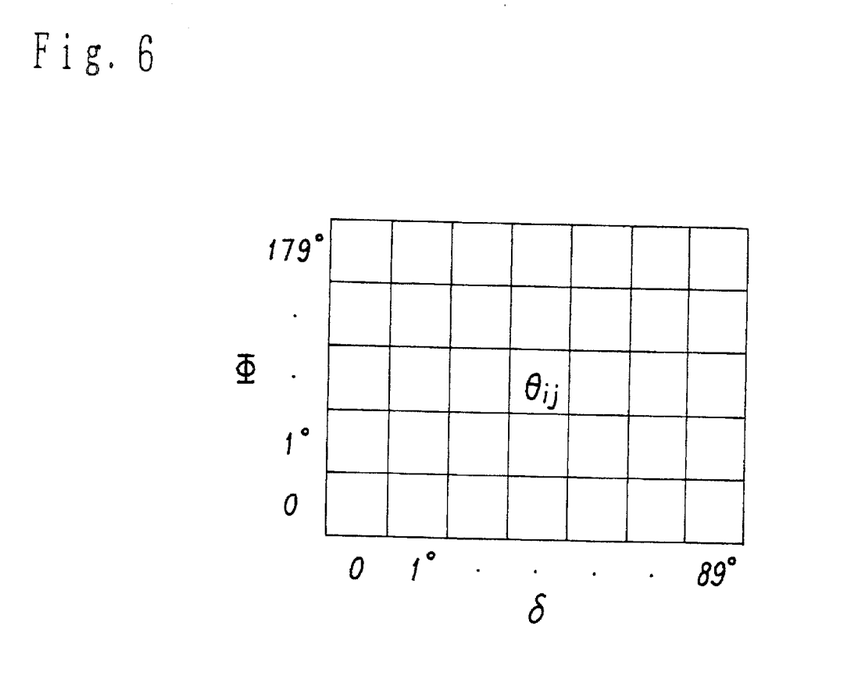
FIG. 6 is a schematic diagram showing a look-up table memory which instantly returns a power factor angle θ from a firing angle φ and lag angle δ measured on a cycle-by-cycle basis.

The embodiment measures the thyristor firing angle $\phi_i$, $\phi_{i+1}$ ..., and the lag angle $\delta_i$, $\delta_{i+1}$..., for each cycle or each half cycle in the voltage and current waveforms shown in FIG. 5. The thyristor firing angle $\phi_i$, $\phi_{i+1}$ ... is measured by the time from a voltage zero cross point to a thyristor turn-on point where the welding current starts conducting. The lag angle $\delta_i$, $\delta_{i+1}$ is measured by the time from a half-cycle later voltage zero cross point to a thyristor turn-off point where the welding current stops flowing.

The microprocessor 28 measures the thyristor firing angle $\phi_i$, $\phi_{i+1}$ ..., and the lag angle $\delta_i$, $\delta_{i+1}$ ... by monitoring the voltage zero cross signal from the detector 44 and the turn-on/off signal from the detector 42.

Computing the power factor angle $\theta_i$, $\theta_{i+1}$ ... for each half cycle from the measured thyristor firing angle $\phi_i$, $\phi_{i+1}$ ... and from the measured lag angle $\zeta_i$, $\zeta_{i+1}$ ..., using the formula (1) would require a considerable time even for the microprocessor 28. In accordance with the embodiment, a computer computes, in advance, values of the power factor angle θ for various combinations of the firing angle θ and lag angle δ, thus providing a power factor angle look-up table shown in FIG. 6. The power factor angle look-up table is stored in the memory 38. During the welding operation the microprocessor 28 retrieves from the power factor angle look-up table an appropriate power factor angle $\theta_{ij}$, using arguments of the thyristor firing angle $\phi_i$ and lag angle $\delta_i$ measured for each half cycle. In this manner, the microprocessor 28 can get a power factor angle θ in real time for each half cycle without requiring complex computations.

Figure 7:
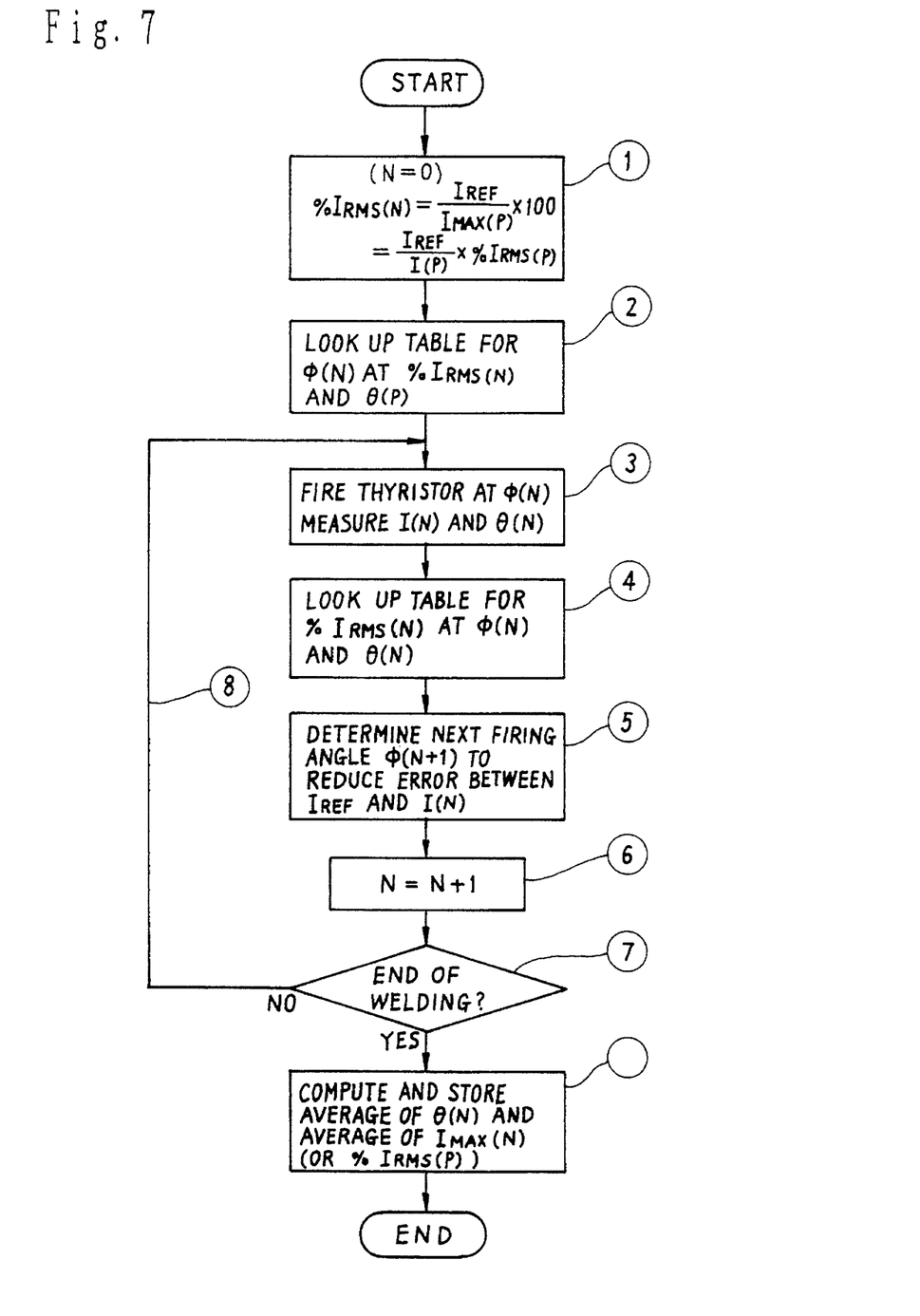
FIG. 7 is a flowchart showing the operation of a microprocessor in FIG. 1 in accordance with the embodiment.

FIG. 7 is a flowchart showing the operation of the microprocessor 28. An external controller (not shown) supplies a start-of-welding command through an input/output (I/O) interface 35.

Then, the microprocessor 28 selects a previous welding operation having a welding condition corresponding to that of a present welding operation. The microprocessor 28 reads from the memory 38 the maximum or relative welding current [IMAX(p)], [%IRMS(p)] measured in the previous welding operation, and the set welding current [IREF] of the present welding operation. Using these data, the microprocessor determines the relative welding current [%IRMS(N)] corresponding to the set welding current [IREF] (step 1).

Then, (step 2), the microprocessor 28 reads from the memory 38 the power factor angle [θ(p)] measured in the previous welding operation. Using the power factor angle [θ(p)] and the relative welding current %IRMS(N), the microprocessor 28 looks up the table (in the memory 38) of the relationship between the thyristor firing angle and the relative welding current, shown in FIG. 2 for the initial thyristor firing angle $\phi_0$.

At the first cycle of the present welding operation, the microprocessor 28 fires the thyristors 14 and 16 at the initial thyristor firing angle $\phi_0$ (step 2). This causes a welding current I to flow for the first cycle. The current measuring circuit 34 coupled to CT 32 measures the welding current of the first cycle and sends the measurement I(0) to the microprocessor 28. The detector 42 detects the turn-on/off of the thyristors 14 and 16 whereas the detector 44 detects the zero crossing of the supplied voltage E. From the detected information, the microprocessor 28 measures the power factor angle $\phi_0$ of the first cycle (step 3).

Then (step 4), the microprocessor 28 looks up the relationship table (FIG. 2) for the relative welding current %IRMS(0) of the first cycle using the initial thyristor firing angle $\phi_0$. Using the relationship of I(0)=IMAX.%IRMS(0), the microprocessor 28 may compute the maximum welding current [IMAX] in place of %IRMS(0). Since the relative welding current %IRMS is the ratio of the actual welding current I to the maximum (full heat) welding current [IMAX], the parameters of [%IRMS] and [IMAX] are interhcangeable or equivalent.

Next (step 5), the microprocessor 28 computes the error between the actual welding current [I(0)] of the first cycle and the set welding current [IREF], and uses it to determine the thyristor firing angle φ(1) of the second cycle such that the error will be reduced toward zero.

In the second cycle, the microprocessor 28 fires the thyristors 14 and 16 (step 3) at the thyristor firing angle φ(1) obtained in step 5. The operation of steps 3–8 continues until the welding operation has ended.

Having finished the welding operation, the microprocessor 28 computes and stores the average of measured power factor angles [θ(0)]–[θ(N)] and average of maximum or relative welding currents [IMAX(0)]–[IMAX(N)], [%IRMS(0)]–[%IRMS(N)], of all cycles, as the power factor angle [θ(p+1)] and maximum or relative welding current [IMAX(p+1)], [%IRMS(p+1)] of the present welding operation (step 9). In place of the average, the power factor angle and maximum or relative welding, measured in the last cycle can be used for this propose. The measurements of the power factor angle [θ(p+1)] and maximum or relative welding current [IMAX(p+1)], [%IRMS(p+1)] of the present welding operation are saved into the database in the memory 38 for a subsequent welding operation.

In this manner, the control apparatus of the embodiment uses measurements of the maximum or relative welding current [IMAX(p)], [%IRMS(p)] and the power factor angle [θ(p)] of a previous welding operation having the same or similar hardware condition of the resistance welding machine to that of the present welding operation to determine the initial thyristor firing angle θ(0) in accordance with the stored table of the relationship between the thyristor firing angle and the relative welding current, shown in FIG. 2. In the first cycle of the present welding operation, the control apparatus fires the thyristors 14 and 16 at the initial thyristor firing angle thus determined. In a subsequent cycle, it fires thyristors at the firing angle φ(1), φ(2) . . . , determined by the feed-back loop.

Figure 8:
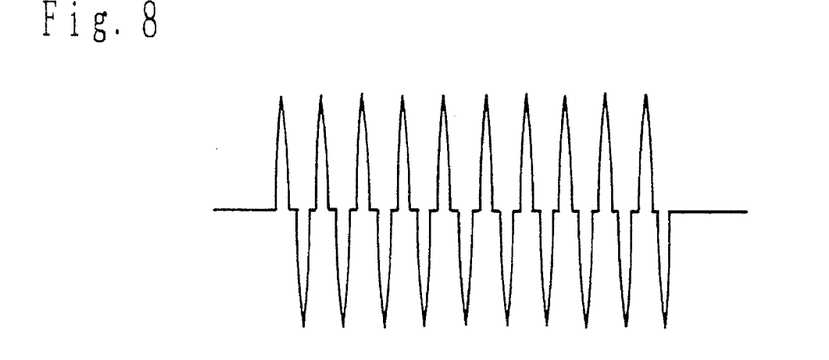
FIG. 8 is a graph showing a welding current waveform obtained with the constant-current control in accordance with the embodiment.

The present method and apparatus can provide an ideal constant-current control without generating an up-slope or overshoot. As shown in FIG. 8, it controls the welding current of the first cyclle with the magnitude essentially matching the set welding current [IREF]. Thus, the present method and apparatus assures a satisfactory weldment with a minimum welding time. These results are most significant in the application of the projection welding since the workpieces are sufficiently heated in a short time.

The control apparatus of the embodiment has the learning feature of extending or updating the database with the maximum or relative welding current [IMAX(p)], [%IRMS(p)] and power factor angle [θ(p)] measured each time of a welding operation. Thus, it can apply to an automatic welding line with frequent change of parts such as welding gun and workpiece.

A welding test may be performed in the event of a new condition of the resistance welding machine, e.g., when the welding transformer, welding gun, or workpiece is changed to a new type. The welding test involves measuring the maximum welding current [IMAX(p)] and power factor angle [θ(p)] in the new condition of the welding machine and saves them in the database.

If desired, CT 34 and current measuring circuit 32 may be provided in the secondary circuit in place of the primary circuit.

The measurement of the power factor angle and maximum welding current can be done for half cycle of the supplied voltage or for particular cycles only in place of each cycle.

What is claimed is:

1. A method of controlling an alternating current resistance welding machine having a predetermined relationship between a thyristor firing angle and a welding current for a power factor angle parameter by controlling said thyristor firing angle on a cycle-by-cycle basis such that the resultant welding current will be essentially equal to a set welding current, comprising the steps of:

determining said thyristor firing angle of a present welding operation from a welding current in and a power factor angle of a previous welding operation and from said set welding current of said present welding operation in accordance with said predetermined relationship;

controlling a welding current in at least a first cycle in said present welding operation in accordance with said determined thyristor firing angle, and controlling a welding current in a subsequent system of said present welding operation with the thyristor firing angle to reduce an error between a measured welding current in a preceding cycle and said set welding current in said present welding operation;

measuring a welding current in said present welding operation;

determining a power factor angle of said present welding operation; and storing said measured welding current and said determined power factor angle of said present welding operation in a memory.

2. The method of claim 1, wherein said measured welding current represents a maximum welding current of said present welding operation.

3. The method of claim 1, wherein said measured welding current represents a relative welding current of said present welding operation.

4. The method of claim 3, wherein the step of determining said thyristor firing angle comprises a step of determining a relative welding current corresponding to said set welding current of said present welding operation from a maximum welding current in said previous welding operation, and a step of determining said thyristor firing angle from said determined relative welding current and a power factor angle in said previous welding operation in accordance with said characteristic.

5. The method of claim 3, wherein the step of determining said thyristor firing angle comprises a step of determining a relative welding current corresponding to said set welding current of said present welding operation from a welding current and relative welding current in said previous welding operation, and a step of determining said firing angle from said determined relative welding current and a power factor angle in said previous welding operation in accordance with said characteristic.

6. The method of claim 1, wherein said predetermined relationship is represented by a characteristic of said thyristor firing angle versus a relative welding current specified by a ratio of a welding current to a maximum welding current for said power factor angle parameter.

7. An apparatus for controlling an alternating current resistance welding machine having a predetermined relationship between a thyristor firing angle and a welding current for a power factor angle parameter, comprising:

a table storage means for storing data of said predetermined relationship;

a first determining means for determining said thyristor firing angle from a welding current and power factor angle in a previous welding operation and from a set welding current of a present welding operation in accordance with said stored data of said predetermined relationship;

a second determining means for determining said thyristor firing angle from an error between a measured welding current and said set welding current;

a current control means for controlling a welding current in at least a first cycle of said present welding operation with said determined thyristor firing angle by said first determining means, and for controlling a welding current in a subsequent cycle of said present welding operation with said determined thyristor firing angle of said second determining means;

a current measuring means for measuring a welding current of said present welding operation;

a power factor angle determining means for determining a power factor angle of said present welding operation; and a storing means for storing said measured welding current and said determined power factor.

8. The apparatus of claim 7, wherein said measured welding current represents a maximum welding current of said present welding operation.

9. The apparatus of claim 8, wherein said first determining means comprises a means for determining a relative welding current corresponding to said set welding current of said present welding operation from a welding current and relative welding current measured in said previous welding operation, and a means for determining said thyristor firing angle from said determined relative welding current and a power factor angle determined in said previous welding operation in accordance with said characteristic.

10. The apparatus of claim 7, wherein said table storage means comprises a means for storing data of said predetermined relationship which is represented by a characteristic of said thyristor firing angle versus a relative welding current specified by a ratio of a welding current to a maximum welding current for said power factor angle parameter.

11. The apparatus of claim 10, wherein said first determining means comprises a means for determining a relative welding current corresponding to said set welding current of said present welding operation from a maximum welding current in said previous welding operation, and a means for determining said thyristor firing angle from said determined relative welding current and a power factor angle determined in said previous welding operation in accordance with said characteristic.

\* \* \* \* \*